Patented Jan. 12, 1932

1,840,553

UNITED STATES PATENT OFFICE

LEONARD JAMES ALLCHIN, OF MANCHESTER, ENGLAND, ASSIGNOR TO IMPERIAL CHEMICAL INDUSTRIES LIMITED, OF LONDON, ENGLAND

NEW BASIC AND ACID DYES OF THE RHODAMINE TYPE

No Drawing. Application filed October 29, 1928, Serial No. 315,933, and in Great Britain November 7, 1927.

It is known that basic dyes may be obtained by condensing fluorescein dichloride and related bodies with simple arylamines or alkoxyarylamines and that sulphonation of the resulting derivatives yields acid rhodamines.

I have now found that unsulphonated o-, m-, and p-aminophenols containing a primary amino group and a free nuclear hydroxyl group, and their derivatives (other than the ethers) may be condensed with fluorescein halides and related bodies of the general structure:

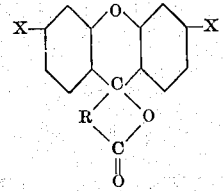

wherein X represents a halogen and R represents a divalent aryl residue which may be further substituted, to form new products which have the following general formula

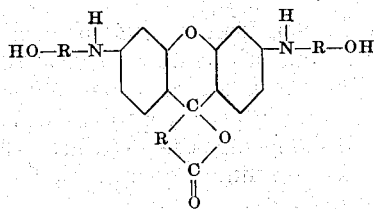

wherein R represents a divalent aryl residue which may be further substituted. These new products upon sulphonation yield new acid dyes of the rhodamine type of particularly valuable properties, on account of their good solubility and the excellent fastness of the dyeings to milling, stoving, acids and light. These new acid dyes are characterized by the following general structural formula

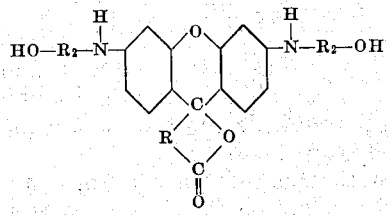

wherein R represents a divalent aryl residue which may be further substituted and $R_2$ represents a divalent aryl residue containing a sulphonic group.

The above-mentioned new products may be made by a process other than the one given above. I find that these new products may also be obtained by condensing the appropriate dihydroxyaryl-amines of the general formula

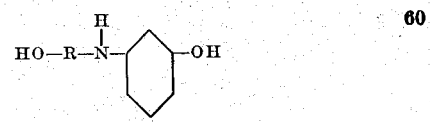

wherein R represents a divalent aryl residue, with phthalic anhydride. But in this case the compounds contain a certain amount of by-products. These by-products are probably acridine derivatives and analogous to those usually obtained in all rhodamine condensations. However, the new products obtained by this second process can be likewise converted into new acid dyes of the specified rhodamine type by sulphonation. The sulphonated dyes thus produced have the same valuable properties as indicated above; but have somewhat yellower shades because of the sulphonation of by-products present. If desired, the yellow by-products may be partly removed by dissolving the acid dyestuff in caustic alkali and carefully salting out.

My invention is illustrated but not limited by the following examples in which the parts are by weight.

*Example 1.*—A mixture of fluorescein dichloride (100 parts), *p*-aminophenol (100 parts), zinc chloride (50 parts), and glycerol (50 parts), is heated for two hours in a copper vessel immersed in an oil-bath at 190–200° C.

The solid mass, consisting of the basic rhodamine dye and other products may be purified by the usual methods, or it may directly be converted by sulphonation into the more valuable acid dye. For this purpose the 280 parts of solid obtained are dissolved in 1400 parts of sulphuric acid monohydrate and heated at 80° C. until a sample is completely soluble in water. The bulk is then poured into 14,000 parts of water and salted out by addition of 700 parts of salt. The product is washed with salt solution until free from acid, and dried. The product so obtained from p-aminophenol is a blue powder, dyeing animal fibres a blue shade.

Similar basic dyes, and sulphonated acid dyes therefrom, giving blues shades, are obtained by substituting for the p-aminophenol in the above example 5-amino-o-cresol or o-aminophenol. The dichloride of tetrachlorofluorescein made from tetrachlorophthalic anhydride may be used in place of fluorescein dichloride, with similar results. From the above disclosure it is apparent that the above process is subject to modification within a considerable range. Various specific compounds of the general class as indicated may be used.

*Example 2.*—40 parts of 3:4'-dihydroxydiphenylamine are mixed with 15 parts of phthalic anhydride and heated in an oil bath to 200° C. for one hour. In addition to the dyestuff described there is produced a product analogous to the acridine derivative obtained in all rhodamine condensations, which on subsequent sulphonation renders the shade yellower. The base so obtained is sulphonated as before, giving the dye of Example 1 contaminated with the yellow by-product. The latter may be partly removed by dissolving the melt in caustic alkali and carefully salting out.

What I claim and desire to secure by Letters Patent is:—

1. In the manufacture of new acid dyes of the rhodamine type, the step which comprises condensing a fluorescein dihalide of the type

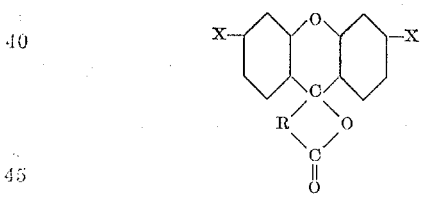

wherein X represents a halogen and R represents a divalent benzene residue or a halogenated benzene residue, with a compound of the type $$H_2N-R_1-OH$$

wherein $R_1$ represents a divalent benzene residue free from sulphonic acid groups.

2. In the manufacture of new acid dyes of the rhodamine type, the step which comprises condensing a flourescein dihalide of the type

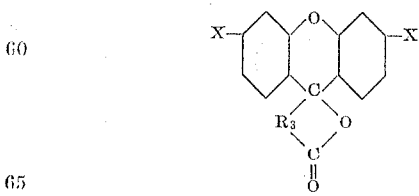

wherein X represents a halogen and $R_3$ represents a divalent monocyclic aryl residue, with a compound of the type $$H_2N-R_4-OH$$

wherein $R_4$ represents a divalent monocyclic aryl residue free from sulphonic acid groups.

3. In the manufacture of new acid dyes of the rhodamine type, the step which comprises condensing a fluorescein dihalide of the type

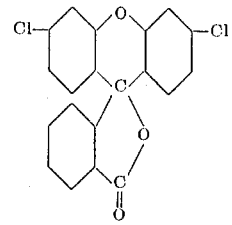

with para-aminophenol.

4. In the manufacture of new acid dyes of the rhodamine type, the step which comprises sulphonating the products obtained by condensing a fluorescein dihalide of the formula

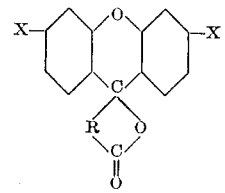

wherein X represents a halogen and R represents a divalent benzene residue or a halogenated benzene residue, with a compound of the type $$H_2N-R_1-OH$$

wherein $R_1$ represents a divalent benzene residue free from sulphonic acid groups.

5. In the manufacture of new acid dyes of the rhodamine type, the process which comprises sulphonating the products obtained by condensing a fluorescein dichloride of the formula

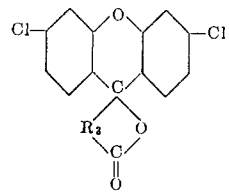

wherein $R_3$ represents a divalent monocyclic aryl residue, with a compound of the type $$H_2N-R_4-OH$$

wherein $R_4$ represents a divalent monocyclic aryl residue free from sulphonic acid groups; and isolating the resulting sulfonated dyestuff.

6. In the manufacture of new acid dyes of the rhodamine type, the process which comprises sulphonating the products obtained by condensing fluorescein dichloride of the formula:

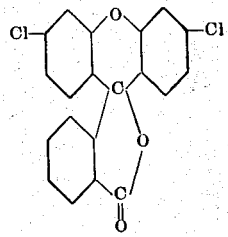

with para-aminophenol; and isolating the resulting sulfonated dyestuff.

7. In the manufacture of new acid dyes of the rhodamine type, the process which comprises sulphonating a basic dye of the rhodamine type having the general formula

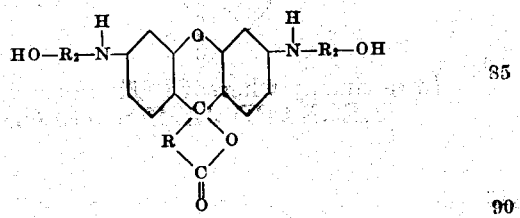

wherein R represents a divalent benzene residue or a halogenated benzene residue and $R_1$ represents a divalent benzene residue free from sulphonic acid groups; and isolating the resulting sulfonated dyestuff.

8. In the manufacture of new acid dyes of the rhodamine type, the process which comprises sulphonating a basic dye of the rhodamine type having the general formula

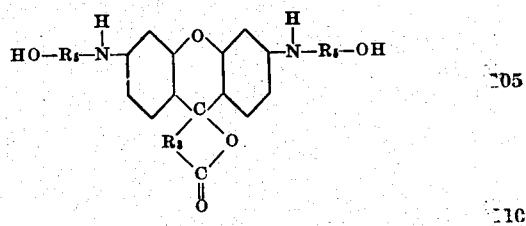

wherein $R_3$ represents a divalent monocyclic aryl residue and $R_4$ represents a divalent monocyclic residue free from sulphonic acid groups; and isolating the resulting sulfonated dyestuff.

9. In the manufacture of new acid dyes of the rhodamine type, the process which comprises sulphonating a basic dye of the rhodamine type having the general formula

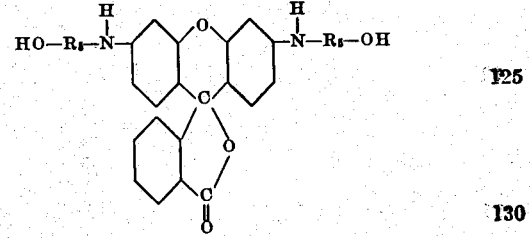

wherein $R_4$ represents a divalent monocyclic aryl residue free from sulphonic acid groups; and isolating the resulting sulfonated dyestuff.

10. In the manufacture of new acid dyes of the rhodamine type, the process which comprises sulphonating a basic dye of the rhodamine type having the formula

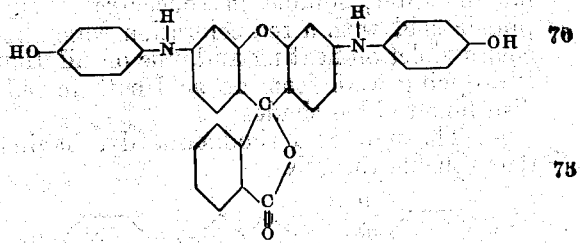

and isolating the so produced sulphonated dyestuff.

11. New acid rhodamine dyes having the probable formula wherein R represents a divalent benzene residue or a halogenated benzene residue and $R_2$ represents a divalent benzene residue containing a sulphonic group, the said dyes being blue powders, soluble in water, soluble in concentrated sulphuric acid with a red coloration which becomes violet on heating and blue on dilution and dyeing wool from an acid bath in reddish blue to blue shades.

12. New acid rhodamine dyes having the probable formula wherein $R_3$ represents a divalent monocyclic aryl residue and $R_5$ represents a divalent monocyclic aryl residue containing a sulphonic acid group, the said dyes being blue powders, soluble in water, soluble in concentrated sulphuric acid with a red coloration which becomes violet on heating and blue on dilution and dyeing wool from an acid bath in reddish blue to blue shades.

13. New acid rhodamine dyes having the probable formula wherein $R_5$ represents a divalent monocyclic aryl residue containing a sulphonic acid group, the said dyes being blue powders, soluble in water, soluble in concentrated sulphuric acid with a red coloration which becomes violet on heating and blue on dilution and dyeing wool from an acid bath in reddish blue to blue shades.

14. The new acid rhodamine dye having the probable formula

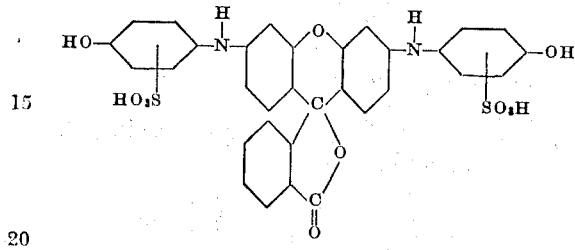

In testimony whereof I affix my signature.
LEONARD JAMES ALLCHIN.